3,257,451
PROCESS FOR THE MANUFACTURE OF BASICALLY AMINOALKYL SUBSTITUTED PHENOL ETHERS
Heinz-Joachim Engelbrecht, Dessau, Germany, assignor to VEB Deutsches Hydrierwerk Rodleben, Rodleben, Germany
No Drawing. Filed Aug. 23, 1963, Ser. No. 304,229
5 Claims. (Cl. 260—570)

The present invention relates to a process for the production of basically substituted phenol ethers of therapeutic value.

A particularly pronounced antihistamine effect is for example exhibited by β-dialkyl substituted aminoalkyl-o-benzylphenol ethers. It is also known that quaternary compounds of β-dialkyl substituted aminoalkylpyrogallol ethers have a curare effect.

It has been suggested (J. Amer. Chem. Soc. 71, 1949, pp. 61–62), to prepare the dialkylaminoalkylethers of the benzylphenols by the reaction, for example, of sodium-2-benzylphenolate with dialkylaminoalkyl halides, in the presence, for example, of boiling toluol. As the dialkylaminoalkyl halides required for this purpose are well known to have a distinct tendency, particularly in the presence of polar solvents, to dimerization and polymerization, steps must be taken to exclude the presence of any traces of water during their reaction with the phenolates, as otherwise considerable losses will occur in the yield of basically substituted phenol ethers.

It is also known (German Patent 1,058,522) that basically substituted phenol ethers are produced by converting o-substituted phenols in an anhydrous organic solvent, such as toluol, into alkali phenolates. The latter are then reacted in the presence of acid binding substances, with basically substituted ethylhalidehydrohalides under reflux. By adding the aqueous solution of a multi basic acid (particularly citric acid) the basic ether formed can then be converted into the corresponding salt and isolated as such.

In a further process (Archiv der Pharmazie 294, 1961, p. 543) use is made, for example, for the production of 4-(2-diethylamino) ethoxybenzoic acid ethyl-ester, of the reaction between 4-hydroxy benzoic acid-ethyl-ester and potassium carbonate in methylethyl ketone—adding 1% of water calculated on the quantity of solvent—and 2-diethylamino-1-chloroethanehydrochloride at 120–125° C.

All the processes mentioned are subject to the drawback that they necessitate high temperatures, combustible organic solvents, long reaction times and comparatively complicated and tedious preparation, and thus occupy a considerable amount of time.

It is a primary object of that invention to overcome the disadvantages of the prior art processes.

It has now been found that dialkylaminoalkyl ethers of phenols can be produced by far simpler means and with very satisfactory yields, even at room temperature, if under certain conditions water is used in place of the organic solvent. This is particularly surprising in view of the fact that the free dialkylaminoalkyl chlorides which form as intermediate products in the reaction, have a pronounced tendency to undergo dimerization, as already mentioned, in polar solvents, particularly water, so that they fail to participate in the further conversion. It was thus by no means to be expected that under the reaction conditions adopted, the results would be almost entirely confined to the formation of phenol ether and that dimerization of the basic alkyl chlorides would for all practical purposes be avoided.

Accordingly, the present invention comprises, in a process for the production of basically substituted phenol ethers by condensation of the alkali salts of a phenol or its substitution products with water soluble salts of tertiary alkylaminoalkyl halides, the step of carrying out the conversion in the presence of alkali and water as solvent, at temperatures below 60° C., preferably between 0 and 30° C.

The process according to the invention can be carried out by adding a phenol to an aqueous solution of caustic alkali (in a molar ratio of 1:2), after which a concentrated solution of di-alkylaminoalkyl chloride hydrochloride in water is gradually added in drops to the resulting phenolate solution, while stirring, and at room temperature, the process being accompanied, if necessary, by cooling. Owing to the formation of two phases which are not soluble in each other, the mixture after a certain time becomes turbid. The stirring is continued for a certain period at room temperature, after which, if necessary, it can be slowly heated up to 50–60° C., in order to complete the reaction, until the upper oily layer which is deposited becomes clear and can be easily separated.

The resulting only slightly coloured basic phenol ether is characterized by a high degree of purity, owing to the mild reaction conditions adopted, so that no distillation is necessary. It can be converted directly in the usual manner into salts such as hydrochloride.

By comparison with the technical progress reached hitherto, the new process provides not merely a saving of energy and of anhydrous solvents but also, owing to the elimination of a series of operations (withdrawal of water, in the production of the phenolate, by boiling toluol, for example, and the distillation of the basic ether and of solvents, in addition to the further simplification of the working up of the ether), a reduction in the time taken to produce the substance. The reaction can be brought about in ordinary vessels of a simple nature, and it provides the products with at least as satisfactory yields as the processes hitherto known, and with a still greater degree of purity.

The invention will now be described by several Examples, it being understood, however, that these Examples are given by way of illustration and not by way of limitation and that many changes may be effected without affecting the scope and spirit of that invention as recited in the appended claims.

*Example 1*

43.5 g. of caustic soda is dissolved in 250 cc. of water. The solution is admixed with 92 g. (½ mol) of o-benzyl phenol. A solution of 102 g. of β-diethylaminoethyl chloride hydrochloride in 50 cc. of water is added to the foregoing, while stirring, at 18–22° C. and in the course of 100 minutes. Owing to slight development of heat, moderate cooling is required from time to time. After a certain time turbidity occurs, owing to the formation of two phases insoluble in each other. The stirring is continued for a further 30 minutes. The mixture is then slowly heated up in about 30 minutes to 50–60° C., and kept at this temperature for as long as is necessary to ensure that the upper layer has become clear, i.e., about 30–60 minutes. After the separation of the aqueous layer, 131.7 g. of β-diethylaminoethyl-2-benzylphenol ether is obtained, corresponding to 93.1% of the theoretical yield. To obtain the hydrochloride, the mixture is dissolved in an organic solvent and treated with hydrogen chloride gas, while cooling. After it has dissolved and recrystallized once, the hydrochloride melts at 157–158° C. (yield: 121.1 g.).

*Example 2*

17 g. of β-dimethylaminoethyl chloride hydrochloride dissolved in 8 cc. of water, is added in drops within 40 minutes to a solution of 18.4 g. of o-benzylphenol and 8.7 g. of caustic soda in 50 cc. water, while stirring and at 5–6° C. After a further 30 minutes the mixture is slowly heated up and re-stirred for about 30 minutes at about 50° C. After the cooling the oily layer is separated, this resulting in the production of 15.5 g. of β-dimethylamino-ethyl-2-benzylphenol ether. The base, dissolved in ether, can be converted by a solution of gaseous hydrochloric acid in ether and with ice cooling into the hydrochloride (M.P. 118–119° C., dissolved and re-crystallized from methyl-propyl-ketone).

*Example 3*

A solution of 9.4 g. of phenol and 8.7 g. of caustic soda in 50 cc. water is given an addition of a solution of 20.4 g. of diethylaminoethylchloride hydrochloride in 10 cc. of water, while stirring, and at 18–20° C. and within 55 minutes. The mixture is then stirred for a further 40 minutes and the bright oily layer is separated in separating funnels. This results in 16.1 g. of β-diethylaminoethyl-phenol ether (B.P. 127–130° C.$^{15}$) corresponding to 83.4% of the theoretical yield.

When 5 g. of this base, dissolved in 30 cc. of ether is treated with a solution of gaseous hydrochloric acid in ether, with ice cooling, 5.8 g. of hydrochloride is produced; M.P.=135–136° C.

*Example 4*

On similar lines to Example 3, 10 g. of p-cresol at 10–15° C. yields 17.8 g. (86% of the theoretical yield) of β-diethylaminoethyl-p-cresol ether (B.P. 93–95° C.$^{0.3}$). The hydrochloride of the base is produced in accordance with Example 2. The yield is 91% of the theoretical yield. M.P. 106–107.5° C.

*Example 5*

On analogous lines to Example 3, 13.9 g. of p-nitrophenol at 20–23° C. yields 17 g. of β-diethylaminoethyl-p-nitrophenol ether (71.4% of the theoretical yield), and the hydrochloride of the latter when dissolved and re-crystallized from acetone, melts at 164–165° C.

*Example 6*

In a solution of 12.6 g. of pyrogallol and 26.4 g. of caustic soda in 50 cc. of water, a solution of 59 g. of diethylaminoethylchloride-hydrochloride in 29 cc. of water is introduced in drops in the course of one hour, while stirring vigorously and at a temperature of 20° C. The mixture is then stirred for one hour at 20° C., then slowly heated up to 60° C., then kept at the same temperature for a further hour. After dilution with 50 cc. of water the resulting oily layer is separated in the separating funnel and dried by potassium carbonate. After the separation of the drying agent, 30 g. of 1,2,3-tris-(β-diethylaminoethoxy)-benzol is obtained, corresponding to 70.9% of the theoretical yield. The base is distilled in vacuum (B.$_{0.1}$175–178° C.) and then converted, in the usual manner, by heating with ethyl iodide in an alcoholic solution, into the tris-etho-iodide. The yield amounts to 82.3% of the theoretical yield. After recrystallization from a mixture of alcohol and acetone, the melting point is 238–240° C.

What is claimed is:

1. The process for production of dialkylaminoalkyl ethers of phenols by condensing a phenol from the group of phenol, o-benzylphenol, pyrogallol, p-cresol, and p-nitrophenol with the aqueous hydrochloride solution of a tertiary alkylaminoalkyl halide from the group of dimethyl-aminoethylchloride, diethylaminoethylchloride, diethylaminopropylchloride in an alkaline aqueous medium at a temperature between about 0–30° C. and heating the reaction mixture up to about 50–60° C. to effect separation of the layers.

2. The process of claim 1 wherein the reaction product is converted into its chloride salt by reaction with a hydrogen chloride acid.

3. The process of claim 1 wherein the phenol is unsubstituted phenol.

4. The process of claim 1 wherein the phenol is o-benzylphenol.

5. The process of claim 1 wherein the phenol is p-nitrophenol.

References Cited by the Examiner

UNITED STATES PATENTS 1,894,865   1/1933   Hartmann et al. ____ 260—570.7

FOREIGN PATENTS 527,714   6/1931   Germany.

CHARLES B. PARKER, *Primary Examiner.*

ROBERT V. HINES, *Assistant Examiner.*